(12) United States Patent
Cagle

(10) Patent No.: US 8,440,742 B2
(45) Date of Patent: May 14, 2013

(54) POLYMER COLLOID-CONTAINING INK-JET INKS FOR PRINTING ON NON-POROUS SUBSTRATES

(75) Inventor: Phillip C. Cagle, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 10/772,792

(22) Filed: Feb. 5, 2004

(65) Prior Publication Data

US 2005/0176847 A1    Aug. 11, 2005

(51) Int. Cl.
| | |
|---|---|
| *B41J 2/01* | (2006.01) |
| *B41J 2/17* | (2006.01) |
| *B41J 2/175* | (2006.01) |
| *C08K 9/00* | (2006.01) |
| *C08L 31/00* | (2006.01) |
| *C08L 33/00* | (2006.01) |
| *C09D 5/00* | (2006.01) |
| *C09D 5/02* | (2006.01) |
| *C09D 11/00* | (2006.01) |
| *G01D 11/00* | (2006.01) |

(52) U.S. Cl.
USPC ........... 523/160; 106/31.6; 347/1; 347/85; 347/95; 347/100; 347/102; 523/161; 523/200; 523/205; 524/556

(58) Field of Classification Search ........... 523/160, 523/161, 200, 205; 524/556; 347/100, 102, 347/1, 85, 95; 106/31.6
See application file for complete search history.

(56) References Cited

U.S. PATENT DOCUMENTS

| | | | | |
|---|---|---|---|---|
| 5,207,824 | A | * | 5/1993 | Moffatt et al. ............ 106/31.58 |
| 5,750,592 | A | * | 5/1998 | Shinozuka et al. .......... 523/161 |
| 6,019,828 | A | * | 2/2000 | Rehman ...................... 106/31.58 |
| 6,177,498 | B1 | | 1/2001 | Rehman |
| 6,402,316 | B1 | | 6/2002 | Ichinose |
| 6,417,249 | B1 | | 7/2002 | Nguyen et al. |
| 6,451,103 | B1 | * | 9/2002 | Uemura et al. ............... 106/493 |
| 6,536,890 | B1 | | 3/2003 | Kato et al. |
| 6,620,470 | B2 | | 9/2003 | Nojima et al. |
| 6,786,586 | B2 | * | 9/2004 | Koga et al. ..................... 347/95 |
| 6,864,302 | B2 | * | 3/2005 | Miyabayashi ............... 523/160 |
| 2002/0077385 | A1 | | 6/2002 | Miyabayashi |
| 2003/0069329 | A1 | * | 4/2003 | Kubota et al. ............... 523/160 |
| 2004/0024083 | A1 | * | 2/2004 | Lee .............................. 523/160 |
| 2004/0055508 | A1 | * | 3/2004 | Miyamoto et al. ......... 106/31.47 |
| 2004/0063807 | A1 | * | 4/2004 | Wang et al. .................. 523/160 |
| 2004/0229974 | A1 | * | 11/2004 | Miyabayashi ............... 523/160 |
| 2006/0007287 | A1 | * | 1/2006 | Cagle et al. .................. 347/100 |

FOREIGN PATENT DOCUMENTS

| | | |
|---|---|---|
| EP | 0 732 381 A1 | 9/1996 |
| EP | 1 371 697 A2 | 12/2003 |
| JP | 2000327974 A | 11/2000 |
| JP | 2002113938 A | 4/2002 |
| JP | 2002347338 A | 12/2002 |
| JP | 200341172 | 9/2004 |
| JP | 2004315739 A | 11/2004 |
| JP | 200521233 | 8/2005 |
| WO | WO 2004/072134 | 8/2004 |

OTHER PUBLICATIONS

Lewis Sr. Richard J.; Hawley's Condensed Chemical Dictionary 13th Ed, John Wiley & Sons, New York, 1997 (p. 459).*
Lewis Sr., Richard J.; Hawley's Condensed Chemical Dictionary 13th Ed., John Wiley & Sons, New York 1997 (p. 470).*

* cited by examiner

*Primary Examiner* — Patrick Niland

(57) ABSTRACT

The present invention is drawn toward an ink-jet ink, comprising an aqueous liquid vehicle having acid-functionalized polymer colloid particulates and polymer-attached pigment colorants dispersed in the liquid vehicle. The liquid vehicle can include at least one volatile co-solvent, each volatile co-solvent present having a boiling point at or below about 285° C. The total amount of volatile co-solvent present in the ink-jet ink can be from 5 wt % to 50 wt %. These ink-jet inks can be printed on traditional as well as non-porous substrates. Optionally, heat can be applied to an image printed with the ink-jet ink to drive off at least a portion of the volatile co-solvent(s).

15 Claims, No Drawings

POLYMER COLLOID-CONTAINING INK-JET INKS FOR PRINTING ON NON-POROUS SUBSTRATES

FIELD OF THE INVENTION

The present invention relates generally to polymer colloid-containing ink-jet inks that can be printed with acceptable adherence on non-porous substrates.

BACKGROUND OF THE INVENTION

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers. Though there has been great improvement in ink-jet printing technology, there is still improvement that can be made in many areas.

With respect to ink-jet ink chemistry, the majority of commercial ink-jet inks are water-based. Thus, their constituents are generally water-soluble (as in the case with many dyes) or water dispersible (as in the case with many pigments). Because of their water-based nature, ink-jet ink systems, in general, tend to exhibit poorer image fade and durability when exposed to water or high humidity compared to other photographic or printing methods.

There has been great improvement in the area of water durability of ink-jet inks through incorporation of certain ink-jet compatible polymer colloids. The polymer colloid can comprise submicron hydrophobic polymeric particles of high molecular weight that are dispersed in an aqueous fluid, which fluid ultimately becomes at least part of a liquid vehicle of an ink-jet ink. When printed as part of an ink-jet ink, polymer colloid particulates of the ink can form a hydrophobic print film on a media surface, entrapping and protecting the colorant within or beneath the film. However, when printing on non-porous substrates, it can be difficult to achieve good adherence between the substrate and the polymer colloid or colorant present in the ink-jet ink. As such, improvements in ink-jet printing on non-porous substrates would be an advancement in the art.

SUMMARY OF THE INVENTION

It has been recognized that it would be advantageous to develop ink-jet inks that have good adherence to films or other non-porous substrates such as vinyl media. In accordance with this recognition, the present invention relates to an ink-jet ink, comprising an aqueous liquid vehicle, acid-functionalized polymer colloid particulates dispersed in the liquid vehicle, and polymer-attached pigment colorants dispersed in the liquid vehicle.

In another embodiment, a system for printing images can comprise an ink-jet ink including an aqueous liquid vehicle having at least one volatile co-solvent, each volatile co-solvent present having a boiling point at or below about 285° C., wherein the total amount of volatile co-solvent present in the ink-jet ink is from 5 wt % to 50 wt %. Additionally, acid-functionalized polymer colloid particulates and polymer-attached pigment colorants can be dispersed in the liquid vehicle. An ink-jet printhead can also be included as part of the system which is configured for printing ink-jet ink. Further, a non-porous substrate configured for receiving the ink-jet ink upon printing with the ink-jet printhead can also be included.

In another embodiment, a method of printing an image with good rub resistance can comprise ink-jetting an ink-jet ink onto a non-porous substrate. The ink-jet ink can include an aqueous liquid vehicle having acid-functionalized polymer colloid particulates and polymer-attached pigment colorants dispersed in the liquid vehicle.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "ink vehicle" refers to the fluid in which pigment and polymer colloid particulates are dispersed to form ink-jettable polymer colloid-containing ink-jet inks in accordance with the present invention. Many liquid vehicles and vehicle components are known in the art. Typical ink vehicles can include a mixture of a variety of different agents, such as surfactants, co-solvents, buffers, biocides, sequestering agents, viscosity modifiers, and water. In addition to the above agents that can be present, the liquid vehicle must include at least one volatile co-solvent, each volatile co-solvent present having a boiling point at or below about 285° C., wherein the total amount of volatile co-solvent present in the ink-jet ink is from 5 wt % to 50 wt %. Further, in one embodiment, an aqueous phase of a polymer colloid dispersion can become part of the liquid vehicle.

The term "pigment" can include particulate dispersible colorants that can be suspended or dispersed in a liquid vehicle in accordance with embodiments of the present invention. Irrespective of other pigments that may be present, at least one pigment type that must be present is a polymer-attached pigment. "Polymer-attached pigments" include pigments having a polymer covalently attached to the surface of the pigment, a polymer adsorbed or grafted onto the surface of the pigment, or a pigment at least partially encapsulated by a polymer. The pigment itself can be a self-dispersed pigment or a non self-dispersed pigment. Self-dispersed pigments include those that have been chemically surface modified with a charge or a polymeric grouping. This chemical modification aids the pigment in becoming and/or substantially remaining dispersed in a liquid vehicle. When a polymeric grouping provides the surface modification, then it is considered to be a polymer-attached pigment without further modification, though further modification is not precluded. The pigment used to form the polymer-attached pigment can also be a non self-dispersed pigment that utilizes a separate and unattached dispersing agent (which can be a polymer, an oligomer, or a surfactant, for example) in the liquid vehicle or physically coated on the surface of the pigment.

The term "polymer colloid" includes polymeric particulates, such as acid functionalized polymeric particulates, that are suspended in an aqueous medium. A polymer colloid can be prepared by copolymerizing an oil in water "monomer emulsion" such that the organic phase is emulsified in an aqueous or water phase. Once the monomer emulsion is polymerized, a polymer colloid, such as a latex dispersion, can be formed. Alternatively, a polymer colloid can be prepared by a solution of a polymer in an organic solvent and "inverting" the composition, i.e. placing the organic phase in water causing small polymeric particulates to form in the water. This is a common method used to form polyurethane and other polymer dispersions. Other techniques for preparing polymer colloids can also be implemented. In some embodiments, a polymer colloid is a liquid suspension comprising a liquid (such as water and/or other liquids) and polymeric particulates from 20 nm to 500 nm (preferably from 100 nm to 300 nm) in size, and having a weight average molecular weight from about 10,000 Mw to 2,000,000 Mw (preferably from about 40,000 Mw to 100,000 Mw). Typically, the polymeric particulate can be present in the liquid at from 0.5 wt % to 15 wt %. Such polymeric particulates can comprise a plurality of monomers that are typically randomly polymerized, and can also be crosslinked and/or have neutralized surface acid groups. When crosslinked, the molecular weight can be even higher than that cited above. Additionally, in one embodiment, the polymer colloid component can have a glass transition temperature from about −25° C. to 100° C.

The term "polymer colloid particulates" or "polymer colloid particles" are the polymeric masses that are dispersed in a polymer colloid dispersion. The polymer colloid particulates can be "acid-functionalized polymer colloid particulates" or "acidified polymer colloid particulates," which refer to neutralized acid groups of polymer colloid particulates that can be present at the surface of polymer colloid particulates. The acid groups provide the polymer colloid particles with electrostatic stabilization to avoid particle to particle aggregation during a firing event and during storage.

The term "volatile co-solvent" refers to co-solvents, preferably humectant co-solvents, which have a boiling at or below about 285° C. Tetraethylene glycol is a classic humectant co-solvent, however, tetraethylene glycol does not have a boiling point that is less than 285° C., and thus, would not be considered a volatile co-solvent for purposes of the present invention.

The term "humectant" refers to substances that holds moisture or, in combination, helps other substances to hold moisture. In other words, a humectant is a substance that promotes retention of moisture and is often added to another substance to keep that substance moist.

The term "non-porous" when referring to a substrate, such as a media substrate, includes surfaces that can have relatively poor water permeability, absorption, and/or adsorption. Vinyl and other plastic sheets or films, metals, coated offset media, glass, certain woods, and other similar substrates are considered to be non-porous.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

The term "about" when referring to a numerical value or range is intended to encompass the values resulting from experimental error that can occur when taking measurements.

With these definitions in mind, pigmented ink-jet inks can be prepared with the use of polymeric binder in order to achieve rub resistance of an image printed on a media substrate. On more porous media, such as office paper, rub resistance can be achieved by adhesion of the polymeric binder with the media surface. However, with nonporous media, such as offset coated media, vinyl or other plastic films, metals, glass, packaging material, etc., rub resistance is much more difficult to achieve. Upon printing, as the surface is substantially nonporous, the colorant particles cannot be buried within a porous network as is the case with porous media. Nonporous media leaves the colorant largely exposed on the surface of the media. Thus, it has been recognized that by formulating ink-jet ink compositions that that can act more like a cohesive film, adhesion and rub resistance can be improved.

Ink-jet printing processes, particularly thermal ink-jet printing process, place a number of limitations on the composition of the polymeric binder that can be used in such an ink-jet ink formulation, which can be problematic when formulating an ink-jet ink. Typically, dry and wet rub resistance tends to improve with the use of high molecular weight, sparingly soluble materials that provide good mechanical properties and are resistant to re-dissolution. Conversely, in order to provide reliable jetting from an ink-jet pen, soluble materials having a low molecular weight (in order to minimize ink viscosity), and which have relatively high re-dissolution rates to avoid decap and jettability problems tend to be preferred for use. One way around these constraints is to use dispersions of polymers (latexes, emulsion, polymer dispersions, etc.). The polymer dispersions can remain as particles until the ink is dried out, then the particles can coalesce into a film. In this manner, durable images can be printed, even from low drop weight ink-jet architectures. Polymer colloids, such as latex dispersions, are particularly useful for this purpose.

As such, an ink-jet ink can comprise an aqueous liquid vehicle having one or more volatile co-solvent, each volatile co-solvent present having a boiling point at or below about 285° C., wherein the total amount of volatile co-solvent present in the ink-jet ink is from 5 wt % to 50 wt %. Also present in the ink-jet ink can be acid-functionalized polymer colloid particulates and polymer-attached pigment colorants dispersed in the liquid vehicle.

In another embodiment, a system for printing images can comprise an ink-jet ink, including an aqueous liquid vehicle having acid-functionalized polymer colloid particulates and polymer-attached pigment colorants dispersed in the liquid vehicle. The liquid vehicle can include one or more volatile co-solvent, each volatile co-solvent present having a boiling point at or below about 285° C., wherein the total amount of volatile co-solvent present in the ink-jet ink is from 5 wt % to 50 wt %. The system can further include an ink-jet printhead configured for printing ink-jet ink and a non-porous substrate configured for receiving the ink-jet ink upon printing with the ink-jet printhead.

In another embodiment, a method of printing an image with good rub resistance can comprise the step of ink-jetting an ink-jet ink onto a non-porous substrate. The ink-jet ink can include an aqueous liquid vehicle having one or more volatile co-solvent, each volatile co-solvent present having a boiling point at or below about 285° C., wherein the total amount of volatile co-solvent present in the ink-jet ink is from 5 wt % to 50 wt %. The ink-jet ink can also include acid-functionalized polymer colloid particulates dispersed in the liquid vehicle, and polymer-attached pigment colorants dispersed in the liquid vehicle.

In each of the above embodiments, the liquid vehicle preferably includes no more than 10 wt % of non-volatile co-solvent, and can even include no more than 2 wt % of non-volatile co-solvent. Still, in other embodiments, the liquid vehicle can be devoid of non-volatile co-solvents.

In accordance with embodiments of the present invention, the liquid vehicle must include water and from 5 wt % to 50 wt % of a volatile co-solvent(s), which can be driven off with heat treatment if an appropriate amount of heat is applied. This amount of volatile co-solvent can be provided by a single volatile co-solvent, or can be provided by a mixture of volatile co-solvents. Table 1 below provides a list of volatile co-solvents, many of which are also humectants, and each of which have a boiling point at or below about 285° C.

TABLE 1

| Solvent | Boiling Point (° C.) |
| --- | --- |
| ethylene glycol | 196 |
| di(ethylene glycol) | 245 |
| tri(ethylene glycol) | 285 |
| propylene glycol | 188 |
| di(propylene glycol) | 245 |
| 2-pyrollidinone | 245 |
| N-methylpyrollidinone | 202 |
| 1,2-propanediol | 187 |
| 1,3-propanediol | 214 |
| 1,2-butanediol | 194 |
| 1,3-butanediol | 203 |
| 1,4-butanediol | 230 |
| 2,3-butanediol | 183 |
| 2,2-dimethyl-1,3-propanediol | 210 |
| 2-methyl-1,3-propanediol (MPdiol) | 213 |
| 1,2-pentanediol | 206 |
| 1,5-pentanediol | 242 |
| 2,4-pentanediol | 201 |
| 1,2-hexanediol | 223 |
| 3,5-dimthyl-3-hexyne-2,5-diol | 205 |
| 2,5-hexanediol | 221 |
| 2-methyl-2,4-pentanediol (hexylene glycol) | 198 |
| 1,6-hexanediol | 250 |
| 2-ethyl-1,3-hexanediol | 242 |
| 2,2,4-trimethyl-1,3-pentanediol (TMPD glycol) | 215–235 |
| 2,5-dimethyl-2,5 hexanediol | 214 |
| sulfolane | 285 |
| 1,4-cyclohexanedimethanol | 285 |
| 2,2-thiodiethanol | 282 |
| 3-pyridyl carbinol | 266 |
| Propylene Glycol Methyl Ether | 120 |
| Dipropylene Glycol Methyl Ether | 190 |
| Tripropylene Glycol Methyl Ether | 243 |
| Propylene Glycol Ethyl Ether | 133 |
| Propylene Glycol n-Propyl Ether | 149 |
| Dipropylene Glycol n-Propyl Ether | 213 |
| Tripropylene Glycol n-Propyl Ether | 261 |
| Propylene Glycol n-Butyl Ether | 171 |
| Dipropylene Glycol n-Butyl Ether | 230 |
| Tripropylene Glycol n-Butyl Ether | 274 |
| Propylene Glycol t-Butyl Ether | 153 |
| Dipropylene Glycol t-Butyl Ether | 212 |
| Propylene Glycol Phenyl Ether | 243 |
| Ethylene Glycol Methyl Ether | 125 |
| Diethylene Glycol Methyl Ether | 194 |
| Triethylene Glycol Methyl Ether | 249 |
| Ethylene Glycol Ethyl Ether | 135 |
| Diethylene Glycol Ethyl Ether | 202 |
| Triethylene Glycol Ethyl Ether | 256 |
| Ethylene Glycol n-Propyl Ether | 150 |
| Ethylene Glycol n-Butyl Ether | 171 |
| Diethylene Glycol n-Butyl Ether | 230 |
| Triethylene Glycol n-Butyl Ether | 280 |
| Ethylene Glycol n-Hexyl Ether | 208 |
| Diethylene Glycol n-Hexyl Ether | 259 |
| Ethylene Glycol Phenyl Ether | 244 |

LEG-1 and tetraethylene glycol, which are commonly used as humectants in pigmented ink-jet ink systems, are co-solvents that are not volatile enough for use as the volatile co-solvent in accordance with embodiments of the present invention, as they tend to leave residual solvent in the ink film after printing. As the ink-jet inks are configured to be printed on smooth or non-porous surfaces, the use of such a solvent in too large of an amount can destroy the durability of the image on the substrate. Thus, in one embodiment, non-volatile co-solvents can be present in minimal amounts, such as less than 10 wt %, or even 2 wt %. In another embodiment, non-volatile co-solvents can be completely removed from the liquid vehicle formulation. If a non-volatile co-solvent is present, it is preferred that it be included in a small amount compared to the amount of volatile co-solvent. For example, 2 wt % of tetraethylene glycol compared to 12 wt % of a volatile co-solvent mixture may be acceptable for use in accordance with embodiments of the present invention. Including tetraethylene glycol or LEG-1 in an ink-jet ink formulation, for example, may be for purposes other than for improving image permanence, such as for improving jettability of ink-jet architecture. Where jettability or other peripheral concerns are not at issue, in one embodiment, as mentioned, the ink-jet ink can be completely devoid of non-volatile co-solvents.

As mentioned, in addition to the volatile co-solvent that is present, other additives can also be used to form the liquid vehicle as well, including a mixture of a variety of different agents, such as surfactants, other co-solvents, buffers, biocides, sequestering agents, viscosity modifiers, and water. A typical liquid vehicle formulation that can be used with the polymer colloid dispersions and polymer colloid ink-jet inks described herein can include water, and optionally, one or more additional co-solvents present in total at from 0.1 wt % to 30 wt %, depending on the ink-jet architecture. Thus, in addition to the above exemplary specific volatile co-solvents that can be used, more general classes of co-solvents that can be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. When selecting a co-solvent for use, if it is considered to be a volatile co-solvent, it can be included in accordance with embodiments of the present invention as described. If the co-solvent is not volatile it should be included in only relatively small amounts, if at all, compared to the amount of volatile co-solvent. Additionally, when more of the volatile co-solvent is present, e.g., >7 wt %, a greater amount of non-volatile co-solvent is less troublesome.

One or more of many surfactants can also be used in accordance with embodiments of the present invention. Such surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, fluoroalkyl polyethylene oxides, substituted amine oxides, and the like. The amount of surfactant added to the formulation of this invention, if added, can range from 0.01 wt % to 10 wt %.

With respect to the co-solvents and surfactants that can be present, selection of such components for use can include an evaluation as to the components wetting properties. For example, the liquid vehicle can include other co-solvents, humectants, and/or surfactants that act as wetting agents, such as $C_5$ to $C_{22}$ aliphatic hydrocarbons, silicone, fluorocarbon surfactants, or the like. These components can be used to wet out low surface energy media.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetraacetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present in total at from 0 wt % to 20.0 wt %.

With respect to the polymer-attached pigment that is present in the formulation, in one embodiment, the colorant can be present at from 0.1 wt % to 10.0 wt %. Exemplary polymer-attached pigments that can be used include polymer-adsorbed pigments, polymer-grafted pigments, polymer-encapsulated pigments, and pigments having a polymer covalently bound to its surface. A single example of polymer-attached pigments is a carbon black pigment that is attached, microencapsulated, or grafted to a styrene acrylic copolymer. In this embodiment, the weight average molecular weight of the copolymer can be from 10,000 Mw to 30,000 Mw. Other examples would be apparent to one skilled in the art after considering the present disclosure.

With reference to the polymer colloid particulates that can be present in the polymer colloid dispersion or polymer colloid-containing ink-jet ink, one or more of many different types of polymer colloids can be used. However, polymer colloids, such as latex dispersions, specifically adapted for use in ink-jet architecture are preferred. Latex particulates, such as would be present in latex paints or the like, which tend to settle and require stirring, though not outside of the present invention, are less preferred for use.

It is to be noted that the polymer colloid dispersions and polymer colloid ink-jet inks of the present invention inherently include a predominantly aqueous phase (or liquid phase) that can include water and other components, such as surfactants, co-solvents, etc. Thus, the liquid phase of the polymer colloid dispersion can be admixed with liquid vehicle components to form the liquid vehicle, or the liquid phase can become the liquid vehicle upon addition of colorants.

Polymer colloid particulates having surface acid groups tend to be more stable over longer periods of time, and tend to resist aggregation. Thus, in one embodiment, neutralized surface acid groups can be present on the polymer colloid particulates. These acid groups can be present throughout the polymer colloid particulates, including on the surfaces, or can be more concentrated at the surfaces. In a more detailed aspect, the polymer colloid particulates can be prepared using acid monomers copolymerized with other monomers to form a monomer emulsion, which in turn, is initiated to form the polymer colloid particulates. The acid functionalities are neutralized to provide a surface charge on the polymer colloid particles. In this embodiment, the acid monomers can be present at from 1 wt % to 15 wt % of total monomers used to form the polymer colloid particulates. Typical acids that have been used to acidify the surface of polymer colloid particulates included carboxyl acids, though stronger acids can also be used. Carboxylic acids are weak acids that have been fairly effective for use in polymer colloid/ink-jet ink systems. For example, methacrylic acid functionalized polymer colloid particulates can be formed using 6 wt % methacrylic acid-containing monomers. During preparation, about half of the methacrylic acid monomers will stay in the bulk of the polymer particle, and the balance may migrate to the surface of the particle.

In another more detailed aspect, the polymer colloid particulates can be provided by multiple monomers copolymerized to form the polymer colloid particulates, wherein the multiple monomers include at least one crosslinking monomer present at from 0.1 wt % to 3 wt % of total monomers used to form the polymer colloid particulates. Such a crosslinking monomer does not provide the acid groups, but can provide other properties to the polymer colloid that can be desirable for ink-jet applications.

A specific example of polymer colloid latex particulates that can be used include those prepared using a monomer emulsion of various weight ratios of styrene, hexyl methacrylate, ethylene glycol dimethacrylate, and methacrylic acid, which are copolymerized to form the latex. Typically, the styrene and the hexyl methacrylate monomers can provide the bulk of the latex particulate, and the ethylene glycol dimethacrylate and methyl methacryalte can be copolymerized therewith in smaller amounts. In this embodiment, the acid group is provided by the methacrylic acid. Though this latex particulate example is provided, other combinations of monomers can be used to form latex particulates. Exemplary monomers that can be used include styrenes, $C_1$ to $C_8$ alkyl methacrylates, $C_1$ to $C_8$ alkyl acrylates, ethylene glycol methacrylates and dimethacrylates, methacrylic acids, acrylic acids, and the like.

Other aspects of the polymer colloids of the present invention can include properties such as desirable glass transition temperature, particulate density, and dielectric constant. For example, in one embodiment, the polymer glass transition temperature of the polymer colloid particulates can be in the range of −20° C. to +30° C., the polymer colloid particulates can be within a density range from 0.9 to 1.1 g/cm$^3$, the particle surface dielectric constant of the polymer colloid particulates can be below 2.8. These properties can be selected individually or in combination to contribute to desired ink performance relative to thermal shear stability, freqcel, decel, decap, particle settling, and co-solvent resistance.

With respect to the use of the optional heating element or device that can be used to drive off at least a portion of the water and volatile co-solvent(s) after printing the ink-jet ink a substrate, one or more of many known heating devices and associated heating techniques can be used. For example, devices for forced air heating, radiant heating, conductive heating, RF drying, and microwave drying are exemplary of device types that provide acceptable results. The temperature (and air flow with respect to forced air systems) can be modified, depending on the type and/or amount of volatile co-solvent(s) that is present in the ink-jet ink-composition. For example, volatile co-solvents having a lower boiling point may not require as much heat (or air flow) to achieve a desired result as volatile co-solvents that have a higher boiling point. Additionally, consideration of the type of substrate that the image is printed on can also affect the determination of how much heat to apply to the printed image.

With respect to the substrate that can be used for application of the printed image, it has been found that the ink-jet inks of the present invention are particularly useful and exhibit good adherence and rub resistance on non-porous media and other non-porous substrates. However, it is to be understood that the ink-jet inks of the preset invention also work well on more traditional porous media substrates, such as plain paper, inorganic coated porous media, or the like.

As a further note, thermal ink-jet systems are quite different in their jetting properties than piezo ink-jet systems. As such, polymer colloid particulates that are effective for use in piezo ink-jet systems are not necessarily effective for use with thermal ink-jet ink systems. However, the converse is not necessarily true. In other words, polymer colloid particulates that work well with thermal ink-jet systems are more likely to work with piezo systems than vice versa. Therefore, the selection or manufacture of polymer colloid particulates for use with thermal ink-jet systems often requires more care, as thermal ink-jet systems are less forgiving than piezo ink-jet systems.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Polymer Colloid Latex Incorporating Methacrylic Acid Monomer About 1160 mL of water is heated in a reactor to 90° C. A solution of 1.39 g of potassium persulfate initiator in 160 mL of water is also prepared. An initial 32 mL of this initiator solution is added to the reactor bath and stirred. Separately, a first monomer emulsion comprising 80 g styrene, 292 g hexyl methacrylate, 4 g ethylene glycol dimethacrylate, 24 g of methacrylic acid, 1.6 g isooctylthio glycolate chain transfer agent, and 9.98 g of 30% Rhodafac RS 710 is prepared in 159.4 mL water. The monomer emulsion is added dropwise to the reaction vessel over a 30 minute period and stirred. Simultaneously, 129.4 g of the initiator solution is dropwise added to the reaction vessel over the same period. The reaction is stirred and maintained at 90° C. for 3 hours. The reaction is then allowed to cool to 50° C. Potassium hydroxide (50% in water) is then added to bring the formed latex solution to a pH of 8.5. The contents are cooled to ambient temperature, and the latex solution is subsequently filtered with a 200 mesh filter to obtain a 20.9% solids latex dispersion including latex particulates with an average particle size of about 230 nm by light scattering.

Example 2

Preparation of Ink-Jet Ink

An ink-jet ink is prepared in accordance with the following formula: 6 wt % 1,2-hexanediol, 6 wt % 2-pyrollidinone, 5 wt % dipropylene glycol, 4 wt % diethylene glycol, 0.5 wt % Zonyl FSO surfactant, 2 wt % styrene-acrylic copolymer encapsulated carbon black pigment, 4 wt % latex particulates prepared in accordance with Example 1, and water (balance).

Example 3

Ink-Jet Printing on Non-Porous Vinyl Substrate

An ink-jet ink prepared in accordance with Example 2 can be printed from a thermal ink-jet printhead at a low drop weight (7 ng) onto non-porous Flexcon Busmark vinyl. After allowing the ink-jet ink to dry for about 20 seconds under a Varitemp VT-750C heat gun (Master Appliance Corp., Racine Wis.) at a heat setting of 8, the resulting image has good image quality, wet and dry rub resistance, and adhesion to the vinyl.

Example 4

Ink-Jet Printing on Non-Porous Print Media

An ink-jet ink prepared in accordance with Example 2 can be printed from a thermal ink-jet printhead at a low drop weight (7 ng) onto non-porous HP Premium printing paper. After allowing the ink-jet ink to dry for about 30 seconds under a Varitemp VT-750C heat gun (Master Appliance Corp., Racine Wis.) at a heat setting of 8, the resulting image has good image quality, wet and dry rub resistance, and adhesion.

In each of Examples 3 and 4 above, rub resistance can be assessed by scrubbing with a Kimwipe laboratory wiper (Kimberley Clark) using about 10 hard scrubs, either dry or wetted with water. In these examples, however, wet rub resistance (or transfer) is typically better than the dry rub resistance, though both are acceptable. For example, no pigment colorant is typically transferred to the Kimwipe upon wet rubbing the printed image, whereas, light transfer can begin to occur when dry rubbing the printed image after about 4 or 5 hard scrubs. More controlled rub testing can be done with a Sutherland rub testing device. With respect to adhesion, this property can be measured by a tape adhesion test, where a length of standard Scotch tape is placed on the printed area, and smoothed down with the thumb. One end is then lifted and pulled back gently about one inch. This loose end is then gripped between the forefinger and thumb and pulled back rapidly for the remainder of its length. The print under the tape is then examined for ink removal, and the tape for ink transfer. Similar results can be achieved using color pigments (cyan, magenta, and yellow) as well.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A system for printing images, comprising:
   a) an ink-jet ink, including:
      i) an aqueous liquid vehicle having at least one volatile co-solvent, each volatile co-solvent present having a boiling point at or below about 285° C., wherein the total amount of volatile co-solvent present in the ink-jet ink is from 5 wt % to 50 wt %, said aqueous liquid vehicle further comprising a non-volatile co-solvent in an amount of from 0.1 wt % to 2 wt %,
      ii) acid-functionalized polymer colloid particulates dispersed in the liquid vehicle, said acid-functionalized polymer colloid particulates including surface acid groups, said surface acid groups provided by acid monomers copolymerized with other monomers to form the polymer colloid particulates, said acid monomers being present at from 1 wt % to 15 wt % of total monomers used to form the polymer colloid particulates, and
      iii) polymer-encapsulated pigment colorants dispersed in the liquid vehicle;
   b) a thermal ink-jet printhead configured for printing ink-jet ink;
   c) a non-porous substrate configured for receiving the ink-jet ink upon printing with the ink-jet printhead; and
   d) a heating element configured for heating the image once it is printed on the non-porous substrate.

2. A system as in claim 1, wherein the liquid vehicle further includes a member selected from the group consisting of $C_1$ to $C_8$ aliphatic hydrocarbons, silicone, fluorocarbon surfactants, and combinations thereof.

3. A system as in claim 1, wherein the acid-functionalized polymer colloid particulates are provided by multiple monomers copolymerized to form the polymer colloid particulates, said multiple monomers including at least one crosslinking monomer present at from 0.1 wt % to 3 wt % of total monomers used to form the polymer colloid particulates.

4. A system as in claim 1, wherein the non-porous substrate is selected from the group consisting of plastic sheets, plastic films, coated papers, glass, and metal.

5. A system as in claim 1, wherein the at least one volatile co-solvent is a humectant.

6. A method of printing an image with good rub resistance, comprising:
   a) ink-jetting from a thermal ink-jet printhead an ink-jet ink onto a non-porous substrate to form the image, said ink-jet ink including:
      i) an aqueous liquid vehicle having at least one volatile co-solvent, each volatile co-solvent present having a boiling point at or below about 285° C., wherein the total amount of volatile co-solvent present in the ink-jet ink is from 5 wt % to 50 wt %, said aqueous liquid vehicle further comprising a non-volatile co-solvent in an amount of from 0.1 wt % to 2 wt %;
      ii) acid-functionalized polymer colloid particulates dispersed in the liquid vehicle; said acid-functionalized polymer colloid particulates including surface acid groups, said surface acid groups provided by acid monomers copolymerized with other monomers to form the polymer colloid particulates, said acid monomers being present at from 1 wt % to 15 wt % of total monomers used to form the polymer colloid particulates, and
      iii) polymer-encapsulated pigment colorants dispersed in the liquid vehicle; and
   b) heating the image once it is printed on the non-porous substrate.

7. A method as in claim 6, wherein the liquid vehicle further includes a member selected from the group consisting of hydrocarbon surfactants, silicone surfactants, fluorocarbon surfactants, and combinations thereof.

8. A method as in claim 6, wherein the acid-functionalized polymer colloid particulates are provided by multiple monomers copolymerized to form the polymer colloid particulates, said multiple monomers including at least one crosslinking monomer present at from 0.1 wt % to 3 wt % of total monomers used to form the polymer colloid particulates.

9. A method as in claim 6, wherein the non-porous substrate is selected from the group consisting of plastic sheets, plastic films, coated papers, glass, and metal.

10. A method as in claim 6, wherein the heating step is carried out at a temperature effective to drive off enough of the volatile co-solvent to improve the image permanence.

11. A method as in claim 6, wherein the at least one volatile co-solvent is a humectant.

12. A system as in claim 1, wherein the acid-functionalized polymer colloid particulates have a density of 0.9 $g/cm^3$ to 1.1 $g/cm^3$.

13. A system as in claim 1, wherein the acid-functionalized polymer colloid particulates have a surface dielectric constant below 2.8.

14. A method as in claim 6, wherein the acid-functionalized polymer colloid particulates have a density of 0.9 $g/cm^3$ to 1.1 $g/cm^3$.

15. A method as in claim 6, wherein the acid-functionalized polymer colloid particulates have a surface dielectric constant below 2.8.

* * * * *